US011909321B2

(12) United States Patent
Sato et al.

(10) Patent No.: US 11,909,321 B2
(45) Date of Patent: Feb. 20, 2024

(54) POWER SUPPLY CONTROLLER AND INSULATED SWITCHING POWER SUPPLY

(71) Applicant: Rohm Co., Ltd., Kyoto (JP)

(72) Inventors: Yoshinori Sato, Kyoto (JP); Yohei Akamatsu, Kyoto (JP); Satoru Nate, Kyoto (JP); Hiroaki Sawaoka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 106 days.

(21) Appl. No.: 17/544,368

(22) Filed: Dec. 7, 2021

(65) Prior Publication Data

US 2022/0185208 A1  Jun. 16, 2022

(30) Foreign Application Priority Data

Dec. 15, 2020 (JP) .................................. 2020-207753
Dec. 15, 2020 (JP) .................................. 2020-207756

(51) Int. Cl.
*H02M 3/335* (2006.01)
*H02M 1/44* (2007.01)
*H02M 1/32* (2007.01)

(52) U.S. Cl.
CPC ......... *H02M 3/33523* (2013.01); *H02M 1/32* (2013.01); *H02M 1/44* (2013.01); *H02M 3/33515* (2013.01)

(58) Field of Classification Search
CPC ..................... H02M 1/32; H02M 1/44; H02M 3/33507–33523
See application file for complete search history.

(56) References Cited

U.S. PATENT DOCUMENTS

| | | | | |
|---|---|---|---|---|
| 2007/0133234 A1* | 6/2007 | Huynh | .............. | H02M 3/33507 363/20 |
| 2008/0031018 A1* | 2/2008 | Negrete | ............ | H02M 3/33507 363/21.17 |
| 2008/0089100 A1* | 4/2008 | Park | .................. | H02M 3/33515 363/21.01 |
| 2009/0021968 A1* | 1/2009 | Komatsu | ........... | H02M 3/33507 363/126 |
| 2013/0141946 A1* | 6/2013 | Sakurai | ............. | H02M 3/33523 363/21.16 |
| 2014/0241014 A1* | 8/2014 | Zhang | ............... | H02M 3/33507 363/21.17 |
| 2015/0098255 A1* | 4/2015 | Nate | ................. | H02M 3/33523 363/21.16 |
| 2017/0353122 A1* | 12/2017 | Su | ..................... | H02M 3/33523 |

FOREIGN PATENT DOCUMENTS

JP  2009-095224  4/2009

* cited by examiner

*Primary Examiner* — Fred E Finch, III

(74) *Attorney, Agent, or Firm* — Fish & Richardson P.C.

(57) ABSTRACT

There is provided a power supply controller including: a monitor voltage generation part configured to generate a monitor voltage according to a primary voltage of a transformer that forms an insulated switching power supply; a sample/hold part configured to sample/hold the monitor voltage and output a feedback voltage; and a controller configured to turn on/off a primary current of the transformer by a fixed on-time method according to the feedback voltage, wherein the sample/hold part samples/holds the primary voltage at a plurality of different timings and outputs one of a plurality of hold values as the feedback voltage.

10 Claims, 12 Drawing Sheets

POWER SUPPLY CONTROLLER AND INSULATED SWITCHING POWER SUPPLY

CROSS-REFERENCE TO RELATED APPLICATIONS

This application is based upon and claims the benefit of priority from Japanese Patent Application No. 2020-207753, filed on Dec. 15, 2020, and Japanese Patent Application No. 2020-207756, filed on Dec. 15, 2020, the entire contents of which are incorporated herein by reference.

TECHNICAL FIELD

The present disclosure relates to a power supply controller and an insulated switching power supply using the same.

BACKGROUND

In the related art, insulated switching power supplies (for example, flyback power supplies) have been installed in a variety of applications, including vehicles.

However, conventional insulated switching power supplies have room for further improvement in load regulation (=output stability against load fluctuation).

In addition, conventional insulated switching power supplies have room for further improvement in EMI [Electro-Magnetic Interference] characteristics.

SUMMARY

In view of the above-mentioned problems found by the inventors of the present disclosure, some embodiments of the present disclosure provide a power supply controller having excellent load regulation and an insulated switching power supply using the same.

Further, in view of the above-mentioned problems found by the inventors of the present disclosure, some embodiments of the present disclosure provide a power supply controller having excellent EMI characteristics and a switching power supply using the same.

According to a First Example of the present disclosure, there is provided a power supply controller including: a monitor voltage generation part configured to generate a monitor voltage according to a primary voltage of a transformer that forms an insulated switching power supply; a sample/hold part configured to sample/hold the monitor voltage and output a feedback voltage; and a controller configured to turn on/off a primary current of the transformer by a fixed on-time method according to the feedback voltage, wherein the sample/hold part samples/holds the primary voltage at a plurality of different timings and outputs one of a plurality of hold values as the feedback voltage (first configuration).

In the power supply controller of the first configuration, the sample/hold part may output the highest one of the plurality of hold values as the feedback voltage (second configuration).

In the power supply controller of the second configuration, when on-duty of the primary current is higher than a predetermined threshold value, the sample/hold part may output a hold value sampled/held at the latest timing as the feedback voltage, without depending on a result of comparison of the plurality of hold values (third configuration).

In the power supply controller of the first configuration, the sample/hold part includes: a plurality of sets of analog switches and capacitors configured to output the plurality of hold values by sampling/holding the monitor voltage at a plurality of different timings; at least one comparator configured to compare the plurality of hold values to generate a selection signal; and a feedback voltage output part configured to output the highest one of the plurality of hold values as the feedback voltage, according to the selection signal (fourth configuration).

In the power supply controller of the fourth configuration, when on-duty of the primary current is higher than a predetermined threshold value, the feedback voltage output part outputs a hold value sampled/held at the latest timing as the feedback voltage, without depending on the selection signal (fifth configuration).

In the power supply controller of any one of the first to fifth configurations, the monitor voltage may be a voltage signal obtained by blunting the primary voltage (sixth configuration).

The power supply controller of any one of the first to sixth configurations may further include: a comparator configured to compare the feedback voltage with a slope-shaped reference voltage to generate a set signal, wherein the controller determines on-timing of the primary current according to the set signal (seventh configuration).

In the power supply controller of any one of the first to seventh configurations, the primary voltage may be a switch voltage appearing in a primary winding of the transformer (eighth configuration).

According to the present disclosure, there is provided an insulated switching power supply including: the power supply controller of any one of the first to eighth configurations; a transformer configured to apply a DC input voltage to a primary winding; and a rectifying/smoothing circuit configured to generate a DC output voltage by rectifying/smoothing an induced voltage appearing in a secondary winding of the transformer (ninth configuration).

According to the present disclosure, there is provided a vehicle including: the insulated switching power supply of the ninth configuration (tenth configuration).

According to a Second Example of the present disclosure, there is provided a power supply controller including: a controller of a hysteresis control type configured to turn on/off an output switch of a switching power supply with a constant duty; and a frequency jitter part configured to apply a jitter to on-time of the output switch (eleventh configuration).

In the power supply controller of the eleventh configuration, the controller may control off-timing of the output switch so that a duty of the output switch becomes constant (twelfth configuration).

In the power supply controller of the twelfth configuration, the controller may compare a DC voltage according to the duty of the output switch with a slope voltage synchronized with the turning-on/off of the output switch to generate a reset signal, and may determine the off-timing of the output switch according to the reset signal (thirteenth configuration).

In the power supply controller of the thirteenth configuration, the frequency jitter part may apply a jitter to a slope of the slope voltage (fourteenth configuration).

In the power supply controller of the fourteenth configuration, the frequency jitter part may include a decoder that converts a gray code into a binary code, and may switch the slope of the slope voltage according to the binary code (fifteenth configuration).

The power supply controller of any one of the eleventh to fifteenth configurations may further include: a comparator configured to compare a feedback voltage according to an output voltage of the switching power supply with a slope-shaped reference voltage to generate a set signal, wherein the controller determines the on-timing of the output switch according to the set signal (sixteenth configuration).

The power supply controller of the sixteenth configuration may further include: a monitor voltage generation part configured to generate a monitor voltage according to a primary voltage of a transformer that forms the switching power supply of an insulated type; and a sample/hold part configured to sample/hold the monitor voltage and output the feedback voltage (seventeenth configuration).

In the power supply controller of the seventeenth configuration, the primary voltage may be a switch voltage appearing in a primary winding of the transformer (eighteenth configuration).

According to the present disclosure, there is provided a switching power supply including: the power supply controller of any one of the eleventh to eighteenth configurations (nineteenth configuration).

According to the present disclosure, there is provided a vehicle including: the switching power supply of the nineteenth configuration (twentieth configuration).

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

<First Example of the Present Disclosure>
<Insulated Switching Power Supply>

Figure 1:
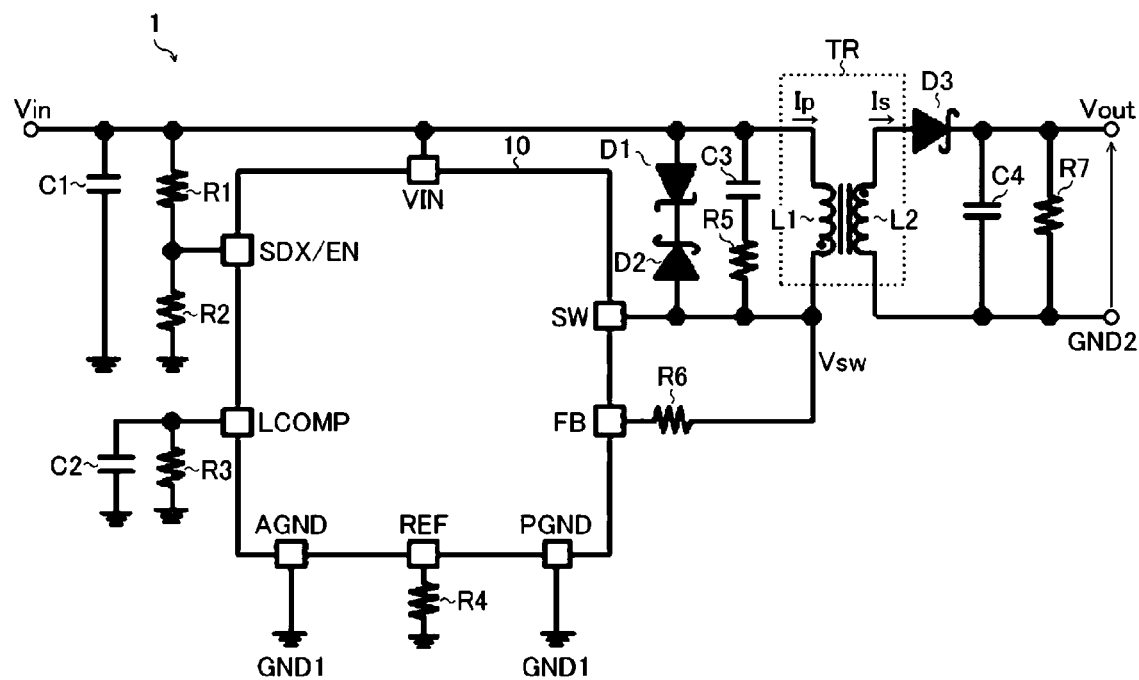
FIG. 1 is a diagram showing an overall configuration of an insulated switching power supply.

FIG. 1 is a diagram showing an overall configuration of an insulated switching power supply. The insulated switching power supply 1 of this configuration example is a flyback power supply that converts a DC input voltage Vin supplied to a primary circuit system (GND1 system) into a desired DC output voltage Vout, and supplies the DC output voltage Vout to a secondary circuit system (GND2 system) while electrically insulating between the primary circuit system and the secondary circuit system. The insulated switching power supply 1 includes a semiconductor device 10 and various discrete components (a transformer TR, capacitors C1 to C4, diodes D1 to D3, and resistors R1 to R7).

When an AC input voltage Vac is supplied to the insulated switching power supply 1, a rectifier circuit (a diode bridge or the like) that converts the AC input voltage Vac into the DC input voltage Vin may be installed in the preceding stage.

The semiconductor device 10 is a so-called power supply control IC, which is provided in the primary circuit system and serves as a control main body of the insulated switching power supply 1. The semiconductor device 10 has a power supply terminal VIN, a switch terminal SW, a feedback terminal FB, a ground terminal PGND (power circuit system), a reference terminal REF, a ground terminal AGND (analog circuit system), a load compensation terminal LCOMP, and an enable terminal SDX/EN, as means for establishing electrical connection with the outside of the device. Of course, the semiconductor device 10 may be appropriately provided with external terminals other than the above, if necessary. The internal configuration of the semiconductor device 10 will be described later.

The power supply terminal VIN is connected to an application end of the DC input voltage Vin and the transformer TR (particularly, the first end of a primary winding Lp to be described later). The switch terminal SW is connected to the transformer TR (particularly, the second end of the primary winding Lp to be described later). Both the ground terminals PGND and AGND are connected to a ground end GND1 of the primary circuit system.

A first end of each of the capacitor C1 and the resistor R1 is connected to the application end of the DC input voltage Vin. Both a second end of the resistor R1 and a first end of the resistor R2 are connected to the enable terminal SDX/EN. A second end of each of the capacitor C1 and the resistor R2 is connected to the ground end GND1 of the primary circuit system.

A first end of each of the capacitor C2 and the resistor R3 is connected to the load compensation terminal LCOMP. A second end of each of the capacitor C2 and the resistor R3 is connected to the grounded end GND1 of the primary circuit system. A first end of the resistor R4 is connected to the reference terminal REF. A second end of the resistor R4 is connected to the ground end GND1 of the primary circuit system.

The anode of the diode D1 (for example, a Zener diode) and a first end of the capacitor C3 are both connected to the first end of the primary winding Lp. The cathode of the diode D1 is connected to the cathode of the diode D2 (for example, a Schottky barrier diode). A second end of the capacitor C3 is connected to a first end of the resistor R5. The anode of the diode D2, a second end of the resistor R5, and a first end of the resistor R6 are all connected to the second end of the primary winding Lp. A second end of the resistor R6 is connected to the feedback terminal FB.

The transformer TR includes a primary winding Lp (a number of turns Np) and a secondary winding Ls (a number of turns Ns) that are magnetically coupled to each other while electrically insulating between the primary circuit system and the secondary circuit system. A first end (winding terminal) of the primary winding Lp is connected to the application end of the DC input voltage Vin. A second end (winding start end) of the primary winding Lp is connected to the switch terminal SW of the semiconductor device 10. In this way, the primary winding Lp is connected in series between the application end of the DC input voltage Vin and the switch terminal SW of the semiconductor device 10.

On the other hand, a first end (winding start end) of the secondary winding Ls is connected to the anode of the diode D3 (for example, a Schottky barrier diode). The cathode of the diode D3 and a first end of each of the capacitor C4 and the resistor R7 are both connected to an output end of the DC output voltage Vout. A second end (winding terminal) of the secondary winding Ls and a second end of each of the capacitor C4 and the resistor R7 are both connected to a ground end GND2 of the secondary circuit system. The diode D3 and the capacitor C4 connected in this way function as a rectifying/smoothing circuit that rectifies/smoothes an induced voltage appearing in the secondary winding Ls of the transformer TR to generate the DC output voltage Vout.

The numbers of turns Np and Ns of the transformer TR may be adjusted arbitrarily so as to obtain the desired DC output voltage Vout (=Vin×(Ns/Np)×(Ton/Toff)), where Ton and Toff are on-time and off-time, respectively, of an output switch 11 to be described later). For example, the larger the number of turns Np or the smaller the number of turns Ns, the lower the DC output voltage Vout, and conversely, the smaller the number of turns Np or the larger the number of turns Ns, the higher the DC output voltage Vout.

<Semiconductor Device>

Figure 2:
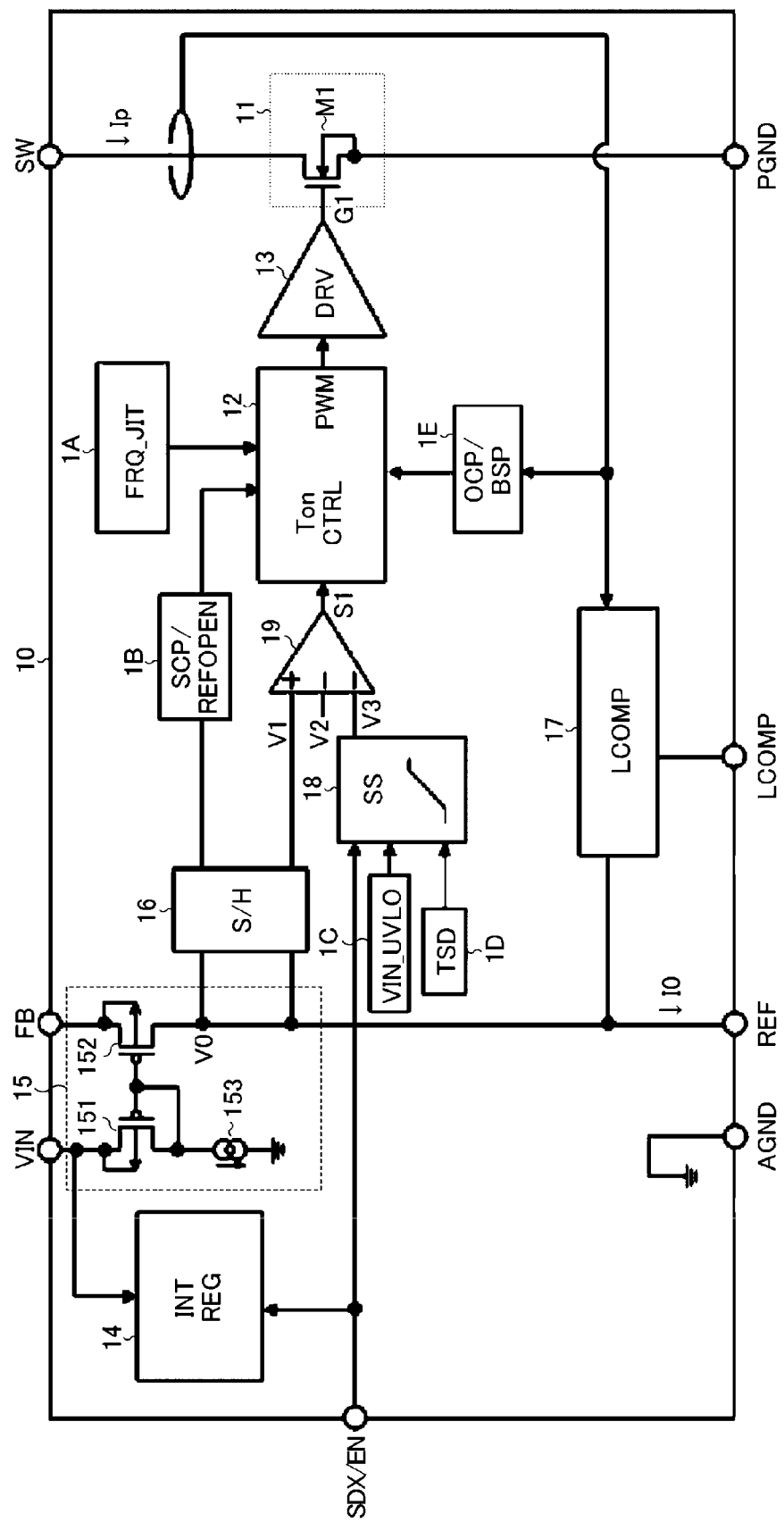
FIG. 2 is a diagram showing a configuration example of a semiconductor device.

FIG. 2 is a diagram showing a configuration example of the semiconductor device 10. The semiconductor device 10 in this figure includes an output switch 11, a controller 12, a driver 13, an internal regulator 14, a monitor voltage generation part 15, a sample/hold part 16, a load compensation part 17, a soft start part 18, a comparator 19, a frequency jitter part 1A, a short-circuit/open protection part 1B, an input low-voltage protection part 1C, a temperature protection part 1D, and an overcurrent/short-circuit protection part 1E. Of course, components other than the above may be appropriately integrated in the semiconductor device 10, if necessary.

The output switch 11 is a switch element that turns on/off a primary current Ip flowing through the primary winding Lp by conducting/cutting off a current path from the application end of the DC input voltage Vin to the ground end GND1 of the primary circuit system via the primary winding Lp of the transformer TR according to a gate signal G1. When an N-channel MOS [Metal Oxide Semiconductor] field effect transistor M1 is used as the output switch 11, the drain of the transistor M1 is connected to the switch terminal SW and the source of the transistor M1 is connected to the ground terminal PGND. In this case, the output switch 11 is turned on when the gate signal G1 is at a high level, and is turned off when the gate signal G1 is at a low level.

The controller 12 receives input of a set signal S1 from the comparator 19 and controls the duty of a pulse signal PWM (accordingly the gate signal G1) so as to turn off/off the primary current Ip of the transformer TR by a hysteresis control method (for example, a fixed on-time method) according to the set signal S1 (accordingly a feedback voltage V1).

More specifically, the controller 12 determines a timing at which the pulse signal PWM is raised to a high level according to the set signal S1 (=a result of comparison between the feedback voltage V1 and a reference voltage V2), that is, the on-timing of the output switch 11 (accordingly the primary current Ip). The reference voltage V2 is basically a slope waveform (CR waveform) obtained by logically inverting the pulse signal PWM and blunting it, and is corrected according to a DC component (corresponding to duty information) of the pulse signal PWM so that a switching frequency fsw (=1/Tsw=1/(Ton+Toff)) of the insulated switching power supply 1) has a constant value (basically a typ value).

Further, the controller 12 generates a reset signal S2 (not shown because it is an internal signal of the controller 12) at a timing when a predetermined on-time Ton elapses after the output switch 11 (accordingly the primary current Ip) is turned on, and turns off the output switch 11 (accordingly the primary current Ip) by lowering the pulse signal PWM to a low level.

The driver 13 generates the gate signal G1 of the output switch 11 in response to the pulse signal PWM. For example, the driver 13 turns on the output switch 11 with the gate signal G1 as a high level when the pulse signal PWM has a high level, while the driver 13 turns off the output switch 11 with the gate signal G1 as a low level when the pulse signal PWM has a low level.

The internal regulator 14 generates a predetermined internal power supply voltage VINTREF from the DC input voltage Vin input to the power supply terminal VIN and supplies the internal power supply voltage VINTREF to each part of the semiconductor device 10. Whether or not the internal regulator 14 can be operated (accordingly whether or not the semiconductor device 10 can be operated) is switched by an enable signal input to the enable terminal SDX/EN.

The monitor voltage generation part 15 is a circuit block configured to generate a monitor voltage V0 according to a primary voltage (for example, a switch voltage Vsw appearing in the primary winding Lp) of the transformer TR including the information of the DC output voltage Vout and includes P-channel type MOS field effect transistors 151 and 152 and a current source 153.

The source of the transistor 151 is connected to the power supply terminal VIN. The source of the transistor 152 is connected to the feedback terminal FB. The gate of each of the transistors 151 and 152 is connected to the drain of transistor 151. The drain of the transistor 151 is connected to a first end of the current source 153. A second end of the current source 153 is connected to a ground end. The drain of the transistor 152 is connected to the reference terminal REF (=an output end of the monitor voltage V0).

The monitor voltage generation part 15 of this configuration example generates a monitor current I0 corresponding to a difference value (=Vin−Vsw) between the DC input voltage Vin applied to the power supply terminal VIN and the switch voltage Vsw applied to the feedback terminal FB and generates the monitor voltage V0 (=I0×R4) by flowing the monitor current I0 through the resistor R4 externally attached to the reference terminal REF. The monitor voltage V0 apparently is a voltage signal in which the switch voltage Vsw is blunted.

The sample/hold part 16 outputs the feedback voltage V1 by sampling/holding the monitor voltage V0. The feedback voltage V1 has a voltage value obtained by multiplying a flyback voltage of the transformer TR by a predetermined coefficient.

The load compensation part 17 adjusts the monitor current I0 (accordingly the monitor voltage V0) according to the primary current Ip so as to cancel the influence of a forward drop voltage Vf of the diode D3 on the high level of the switch voltage Vsw. The load compensation part 17 includes the capacitor C2 and the resistor R3 externally attached to the load compensation terminal LCOMP, as components.

The soft start part 18 generates a soft start voltage V3 that gradually rises from 0V to the internal power supply voltage VINTREF when the enable signal input to the enable terminal SDX/EN has a logical level (for example, a high level) at the time of enable. The soft start part 18 is introduced to suppress an inrush current and an overshoot at the time of starting. The soft start time Tss (=the time required for the soft start voltage V3 to reach the internal power supply voltage VINTREF from 0V) may be fixed inside the semiconductor device 10.

The comparator 19 compares the feedback voltage V1 input to a non-inverting input end (+) with a lower one of the slope-shaped reference voltage V2 input to a first inverting input end (−) and the soft start voltage V3 input to a second inverting input end (−) to generate the set signal S1. For example, the set signal S1 has a high level when the feedback voltage V1 is higher than the reference voltage V2, and has a low level when the feedback voltage V1 is lower than the reference voltage V2.

The frequency jitter part 1A periodically changes the switching frequency fsw of the insulated switching power supply 1 by applying a jitter to the on-time Ton of the output switch 11.

If the monitor voltage V0 becomes lower than a short-circuit detection threshold value when the output switch 11 is turned off, the short-circuit/open protection part 1B detects a short-circuit abnormality of the reference terminal REF and notifies the controller 12 of the detected short-circuit abnormality. Further, if the monitor voltage V0 becomes higher than an open detection threshold value when the output switch 11 is turned on, the short-circuit/open protection part 1B detects an open abnormality of the reference terminal REF and notifies the controller 12 of the detected open abnormality. The controller 12 forcibly stops the switching operation when the short-circuit/open abnormality is detected. When a predetermined restoration time elapses after the switching operation is forcibly stopped, the switching operation is automatically restored through a soft start operation.

If the DC input voltage Vin applied to the power supply terminal VIN becomes lower than a UVLO [Under-Voltage Locked Out] detection threshold value, the input low-voltage protection part 1C detects a low-voltage abnormality and notifies the detected low-voltage abnormality to the controller 12. The controller 12 forcibly stops the switching operation when the low-voltage abnormality is detected. If the DC input voltage Vin becomes higher than a UVLO release threshold value, the switching operation is automatically restored through the soft start operation.

If the chip temperature of the semiconductor device 10 (for example, the junction temperature Tj of the output switch 11) becomes higher than a TSD [Thermal Shut-Down] detection threshold value, the temperature protection part 1D detects a temperature abnormality and notifies the controller 12 of the detected temperature abnormality. The controller 12 forcibly stops the switching operation when the temperature abnormality is detected. If the chip temperature of the semiconductor device 10 becomes lower than a TSD release threshold value, the switching operation is automatically restored through the soft start operation.

If the primary current Ip flowing when the output switch 11 is turned on becomes larger than an overcurrent detection threshold value, the overcurrent/short-circuit protection part 1E detects an overcurrent state of the primary current Ip and notifies the controller 12 of the detected overcurrent state. The controller 12 forcibly turns off the output switch 11 when the overcurrent state is detected. Since the overcurrent detection operation is performed every switching cycle, the on-duty is limited at the time of overcurrent detection, and thus the DC output voltage Vout drops.

Further, if the primary current Ip flowing when the output switch 11 is turned on becomes larger than a short-circuit detection threshold value, the overcurrent/short-circuit protection part 1E detects a short-circuit abnormality (=battery short-circuit) of the switch terminal SW and notifies the controller 12 of the detected short-circuit abnormality. The controller 12 forcibly stops the switching operation when the short-circuit abnormality is detected. If a predetermined restoration time elapses after the switching operation is forcibly stopped, the switching operation is automatically restored through the soft start operation.

<Basic Operation>

The basic operation of the insulated switching power supply 1 will be briefly explained. Since the primary current Ip flows from the application end of the DC input voltage Vin toward the ground end GND1 via the primary winding Lp and the output switch 11 for the on-time Ton of the output switch 11, electrical energy is stored in the primary winding Lp.

After that, when the output switch 11 is turned off, an induced voltage is generated in the secondary winding Ls magnetically coupled to the primary winding Lp, and a secondary current Is flows from the secondary winding Ls toward the ground end GND2 via the diode D3 and the capacitor C4. At this time, the DC output voltage Vout obtained by rectifying/smoothing the induced voltage of the secondary winding Ls is output.

After that, the same switching output operation as described above is repeated by turning the output switch 11 on/off.

In this way, according to the insulated switching power supply 1 of the present embodiment, it is possible to generate the desired DC output voltage Vout from the DC input voltage Vin while electrically insulating between the primary circuit system and the secondary circuit system.

<Fixed On-Time Control>

Figure 3:
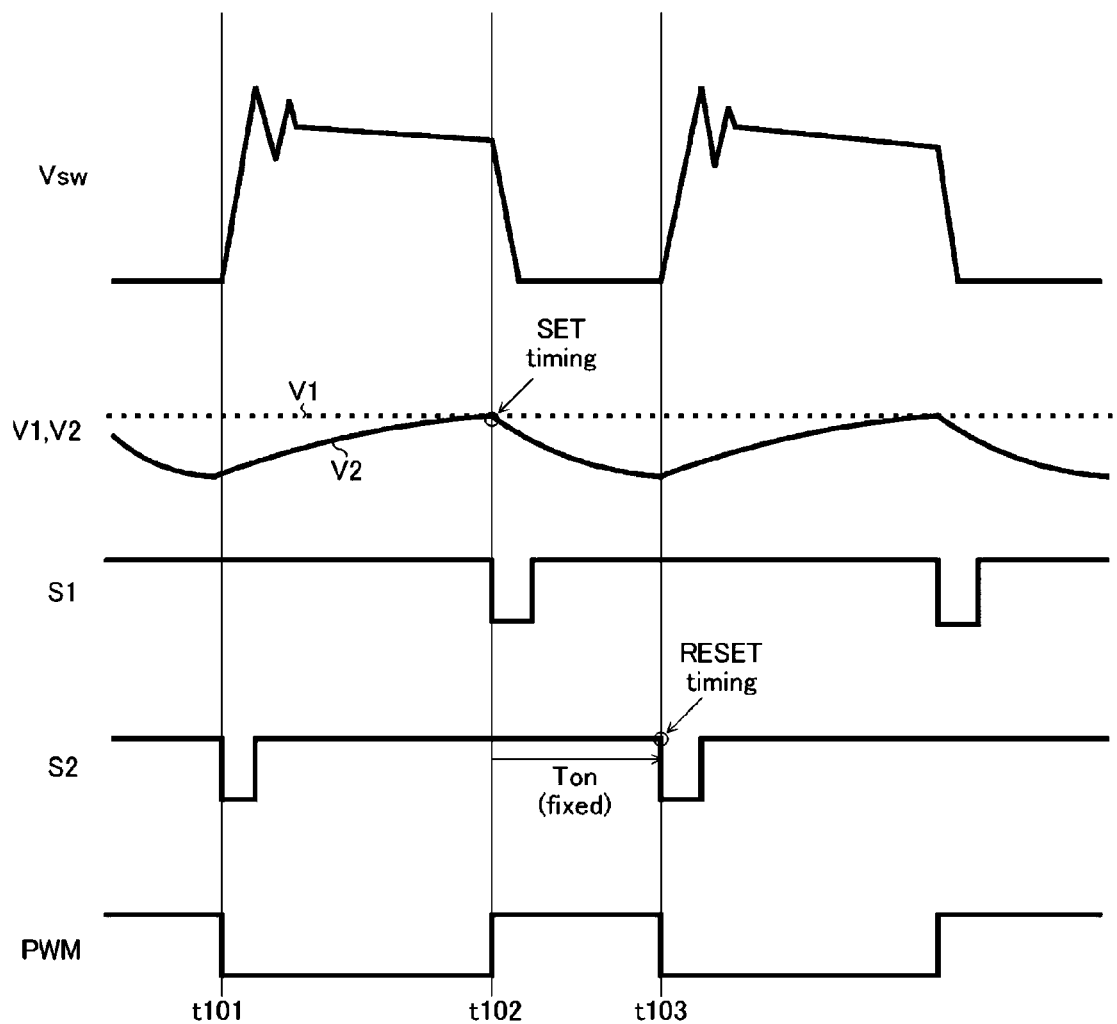
FIG. 3 is a diagram showing a basic operation of fixed on-time control.

FIG. 3 is a diagram showing the basic operation of fixed on-time control, depicting the switch voltage Vsw, the feedback voltage V1 (broken line) and the reference voltage V2 (solid line), the set signal S1, the reset signal S2, and the pulse signal PWM in order from the top.

At time t101, when the reset signal S2 falls to a low level, the pulse signal PWM is reset to a low level. As a result, the output switch 11 is turned off, so that the switch voltage Vsw rises from a low level to a high level. Further, at time t101, the reference voltage V2 changes from a decrease to an increase as the pulse signal PWM falls. However, since the reference voltage V2 is lower than the feedback voltage V1, the set signal S1 is maintained at a high level.

At time t102, when the reference voltage V2 becomes higher than the feedback voltage V1, the set signal S1 falls to a low level, so that the pulse signal PWM is set to a high level. As a result, since the output switch 11 is turned on, the switch voltage Vsw falls from the high level to the low level. Further, at time t102, the reference voltage V2 changes from the increase to the decrease as the pulse signal PWM rises.

At time t103, when a predetermined on-time Ton elapses from the on-timing (=time t102) of the output switch 11, the reset signal S2 falls to the low level. As a result, since the pulse signal PWM is reset to the low level as at time t101 mentioned above, the output switch 11 is turned off, the switch voltage Vsw rises to the high level and simultaneously the reference voltage V2 changes from the decrease to the increase.

By repeating the above series of operations even after time t103, the insulated DC switching power supply 1 generates the desired DC output voltage Vout from the DC input voltage Vin by fixed on-time control.

<Consideration on Sampling Timing>

As described above, in the insulated switching power supply 1, by monitoring the switch voltage Vsw including the information of the DC output voltage Vout, output feedback control is performed only in the primary circuit system without using a photocoupler or the like. The high level of the switch voltage Vsw obtained during the turning-on period of the output switch 11 can be expressed by the following equation (1). In the equation, symbol Vf indicates the forward drop voltage of the diode D3, and symbol ESR indicates the total impedance (impedance components of the secondary winding Ls and a substrate) of the secondary circuit system.

$$Vsw = Vin + (Np/Ns) \times (Vout + Vf + Is \times ESR) \quad (1)$$

As can be seen from the above equation (1), the high level of the switch voltage Vsw includes not only the DC output voltage Vout but also a parameter (=Vf+Is×ESR) depending on the secondary current Is. Therefore, it is ideal to sample the switch voltage Vsw at a timing immediately before the secondary current Is stops flowing as much as possible.

However, when a pulse-driven switch voltage Vsw is sampled at a fixed timing, the feedback voltage V1 (=a hold value of the monitor voltage V0) output from the sample/hold part 16 fluctuates depending on application settings and load conditions, which may deviate the DC output voltage Vout from a target value, that is, deteriorate the load regulation. Hereinafter, the basic circuit configuration of the sample/hold part 16 will be illustrated, and the cause of the deterioration of the load regulation will be considered.

Sample/Hold Part (First Embodiment)

Figure 4:
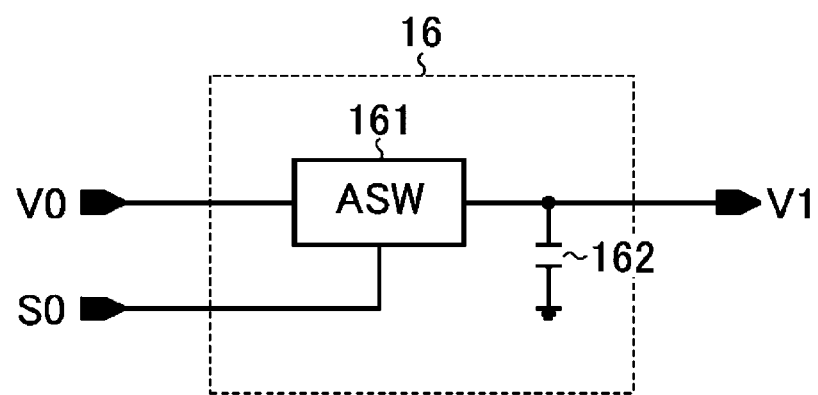
FIG. 4 is a diagram showing a first embodiment (comparative example) of a sample/hold part.

FIG. 4 is a diagram showing a first embodiment of the sample/hold part 16 (corresponding to a comparative example compared with a second embodiment to be described later). The sample/hold part 16 of the first embodiment includes an analog switch 161 and a capacitor 162. The analog switch 161 is connected between an input end of the monitor voltage V0 and an output end of the feedback voltage V1 and is turned on/off according to a timing control signal S0. The capacitor 162 is connected between the output end of the feedback voltage V1 and a ground end.

In the sample/hold part 16 of the present embodiment, the capacitor 162 is charged with the monitor voltage V0 during the turning-on period (=the sampling period) of the analog switch 161. On the other hand, during the turning-off period (=the hold period) of the analog switch 161, a charging voltage of the capacitor 162 is held as the feedback voltage V1.

Figure 5:
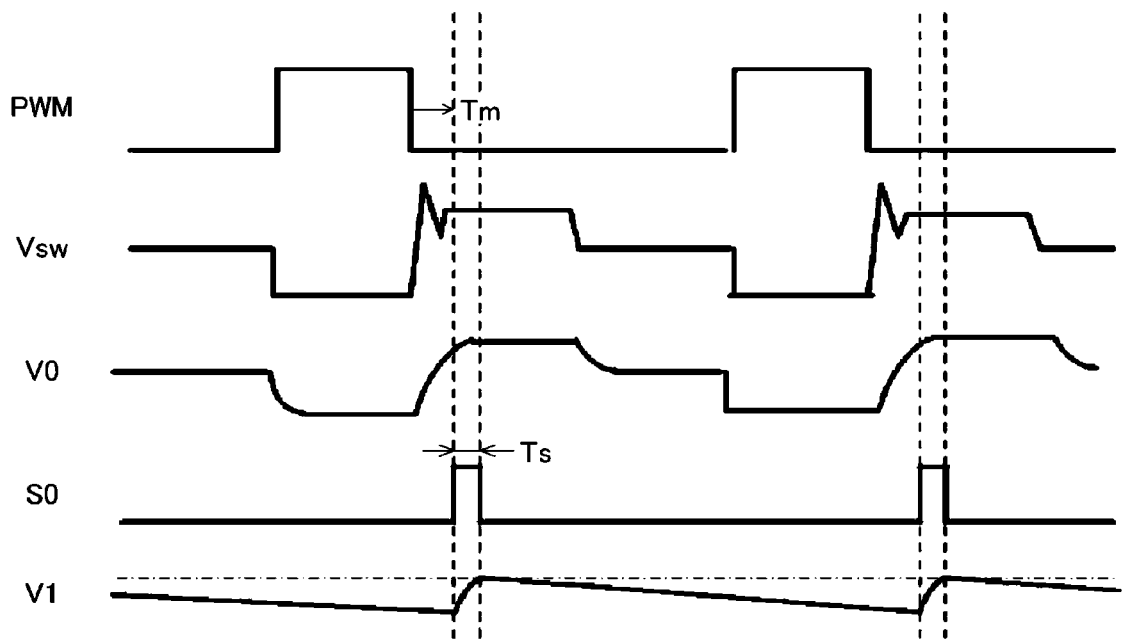
FIG. 5 is a diagram showing a first example of a sample/hold operation in the first embodiment.

FIG. 5 is a diagram showing a first example (an example in which a sampling timing is appropriate) of a sample/hold operation in the first embodiment, depicting the pulse signal PWM, the switch voltage Vsw, the monitor voltage V0, the timing control signal S0, and the feedback voltage V1 in order from the top.

The timing control signal S0 rises to a high level at a timing when a mask time Tm elapses after the pulse signal PWM falls to a low level, and falls to a low level at a timing when a sampling time Ts elapses.

The high level period of the timing control signal S0 corresponds to the turning-on period (=the sampling period) of the analog switch 161, and the low level period of the timing control signal S0 corresponds to the turning-off period (=the hold period) of the analog switch 161.

As shown in this figure, when the sampling timing of the monitor voltage V0 is set appropriately (=when the high level of the monitor voltage V0 can be sampled correctly), the output feedback control is applied so that the feedback voltage V1 matches the target value (see a one-dot chain line).

At the time of a light load, since the turning-off time Toff of the output switch 11 (corresponding to the high level period of the switch voltage Vsw) becomes short, it is necessary to advance the sampling timing. On the other hand, at the time of a heavy load, since a surge component of the switch voltage Vsw generated when the output switch 11 is turned off becomes large, it is desirable to lag the sampling timing.

Further, since the monitor voltage V0 has a signal waveform in which the switch voltage Vsw is blunted so as not to be easily affected by the surge component, the monitor voltage V0 rises later than the switch voltage Vsw. Therefore, it is necessary to lag the sampling timing as much as possible in order to prevent the monitor voltage V0 from being sampled in the middle of rising.

Figure 6:
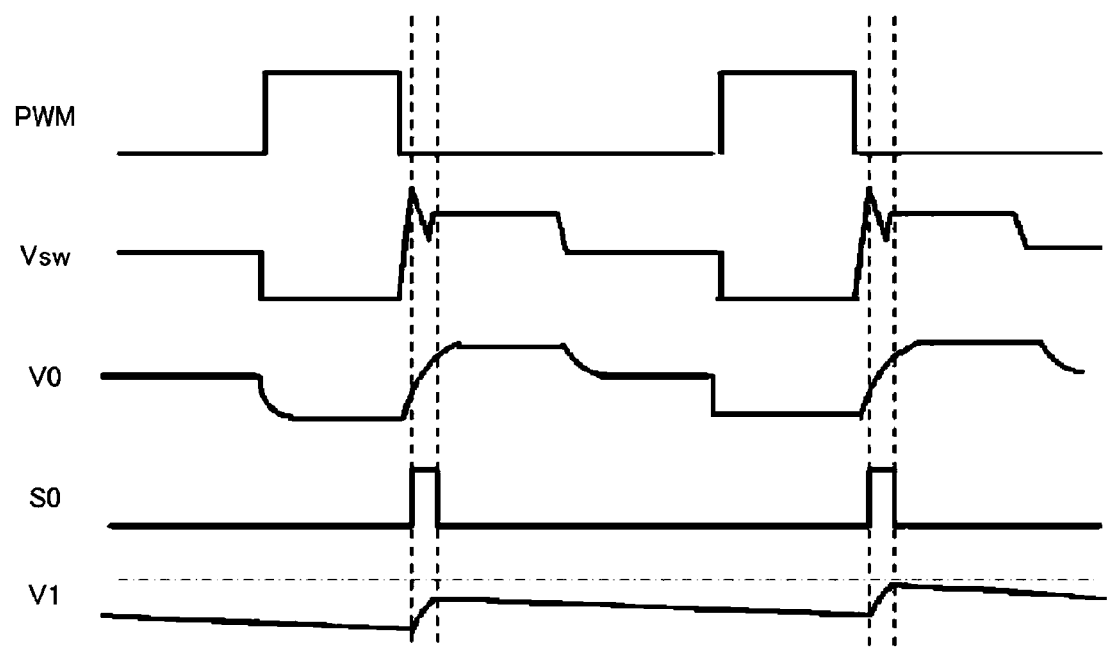
FIG. 6 is a diagram showing a second example of a sample/hold operation in the first embodiment.

FIG. 6 is a diagram showing a second example (an example in which the sampling timing is too early) of the sample/hold operation in the first embodiment, depicting the pulse signal PWM, the switch voltage Vsw, the monitor voltage V0, the timing control signal S0, and the feedback voltage V1 in order from the top, as in FIG. 5 described earlier.

As shown in FIG. 6, if the sampling timing is too early, the monitor voltage V0 will be sampled in the middle of rising. In this case, since the feedback voltage V1 takes a value lower than the target value, the DC output voltage Vout is output higher than the target value. Although not illustrated in this figure, if the monitor voltage V0 jumps up due to the influence of the surge component of the switch voltage Vsw, the feedback voltage V1 can take a value higher than the target value. In that case, the DC output voltage Vout is output lower than the target value.

Figure 7:
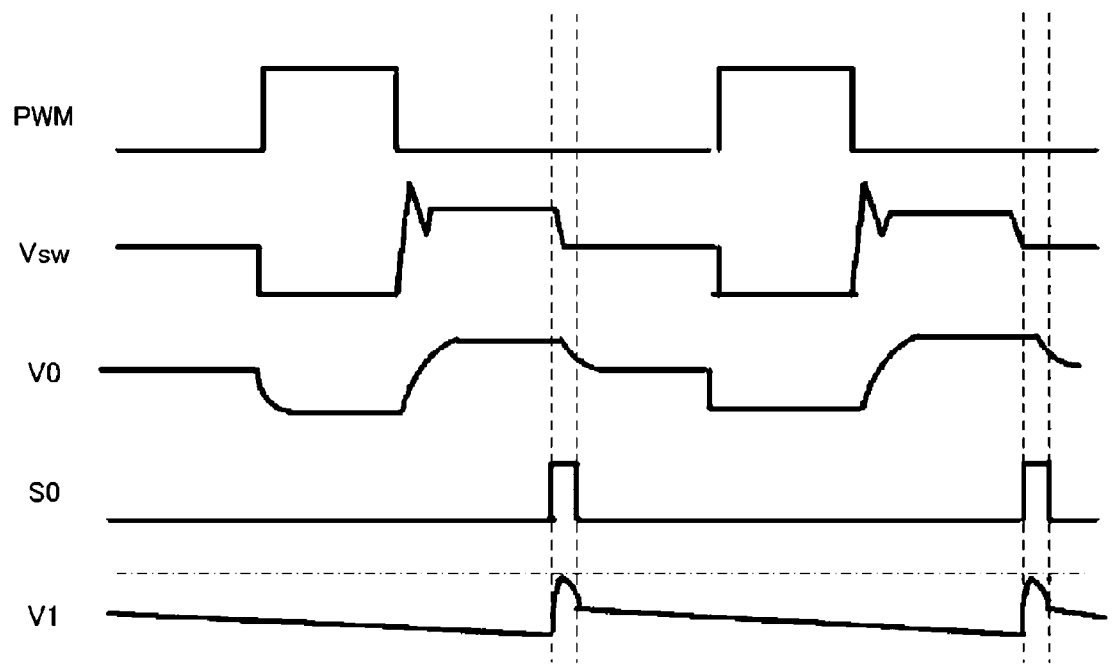
FIG. 7 is a diagram showing a third example of a sample/hold operation in the first embodiment.

FIG. 7 is a diagram showing a third example (an example in which the sampling timing is too late) of the sample/hold operation in the first embodiment, depicting the pulse signal PWM, the switch voltage Vsw, the monitor voltage V0, the timing control signal S0, and the feedback voltage V1 in order from the top, as in FIGS. 5 and 6 described earlier.

As shown in FIG. 7, if the sampling timing is too late, the flyback voltage of the transformer TR disappears, and the monitor voltage V0 is sampled after the high level of the switch voltage Vsw begins to decrease. Further, as an extreme example, if the output switch 11 is turned on by the time the sampling timing arrives, the switch voltage Vsw decreases to a low level, and thus the monitor voltage V0 cannot be sampled. In either case, since the feedback voltage V1 takes a value lower than the target value, the DC output voltage Vout is output higher than the target value.

In this way, if the sampling timing is not set appropriately (FIGS. 6 and 7), the high level of the switch voltage Vsw (accordingly the DC output voltage Vout) cannot be monitored correctly, which may cause deterioration of the load regulation. Although a current discontinuous mode is illustrated in each of FIGS. 5 to 7, the same applies to a current continuous mode.

In a conventional switching power supply, the deterioration of the load regulation is suppressed by adjusting a transformer, a snubber circuit, etc., but a new embodiment of the sample/hold part 16 capable of improving the load regulation without requiring complicated adjustment is suggested below.

Sample/Hold Part (Second Embodiment)

Figure 8:
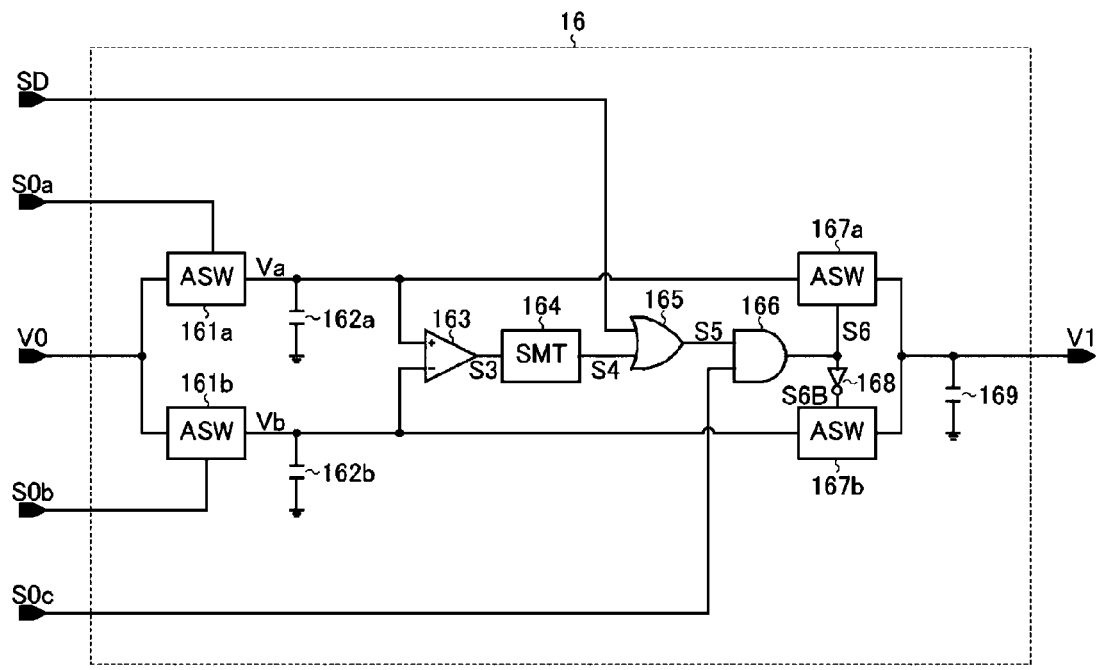
FIG. 8 is a diagram showing a second embodiment of the sample/hold part.

FIG. 8 is a diagram showing a second embodiment of the sample/hold part 16. The sample/hold part 16 of the present embodiment is a circuit block that samples/holds the monitor voltage V0 at a plurality of different timings and outputs any one of a plurality of hold values as the feedback voltage V1.

Referring to this figure, the sample/hold part 16 of the present embodiment includes analog switches 161a and 161b, capacitors 162a and 162b, a comparator 163, a Schmitt trigger 164, an OR gate 165, and an AND gate 166, analog switches 167a and 167b, an inverter 168, and a capacitor 169.

The analog switch 161a is connected between the input end of the monitor voltage V0 and an output end of a hold voltage Va. For example, the analog switch 161a is turned on when a timing control signal S0a is at a high level, and is turned off when the timing control signal S0a is at a low level. The timing control signal S0a has the high level at a first sampling timing (for example, between 350 and 430 ns with a timing at which the pulse signal PWM falls to a low level, as a reference (0 s)).

The analog switch 161b is connected between the input end of the monitor voltage V0 and an output end of a hold voltage Vb. For example, the analog switch 161b is turned on when a timing control signal S0b is at a high level, and is turned off when the timing control signal S0b is at a low level. The timing control signal S0b has the high level at a second sampling timing (for example, between 150 and 250 ns with a timing at which the pulse signal PWM falls to a low level, as a reference (0 s)).

The capacitor 162a is connected between the output end of the hold voltage Va and a ground end. During the turning-on period of the analog switch 161a, the capacitor 162a is charged with the monitor voltage V0. On the other hand, during the turning-off period of the analog switch 161a, the charging voltage of the capacitor 162a is held as the hold voltage Va.

The capacitor 162b is connected between the output end of the hold voltage Vb and the ground end. During the turning-on period of the analog switch 161b, the capacitor 162b is charged with the monitor voltage V0. On the other hand, during the turning-off period of the analog switch 161b, the charging voltage of the capacitor 162b is held as the hold voltage Vb.

The comparator 163 compares the hold voltage Va input to a non-inverting input end (+) with the hold voltage Vb input to an inverting input end (−) to generate a selection signal S3. The selection signal S3 has a high level when Va>Vb, and a low level when Va<Vb.

The Schmitt trigger 164 receives an input of the selection signal S3 and outputs a selection signal S4 (=a pulse signal obtained by shaping the waveform of the selection signal S3).

The OR gate 165 generates an OR signal S5 of the selection signal S4 and duty information signal SD. The OR signal S5 has a high level when either the selection signal S4 or the duty information signal SD is at a high level, and has a low level when both the selection signal S4 and the duty information signal SD are at a low level. The duty information signal SD has a high level when the on-duty Don (=Ton/Tsw×100[%]) of the output switch 11 (accordingly the primary current Ip) is higher than a predetermined threshold value (for example, 38%), and has a low level when the on-duty Don is lower than the threshold value. That is, at the time of light load, the selection signal S3 is output through as the OR signal S5, while at the time of heavy load, the OR signal S5 is fixed at a high level.

The AND gate 166 generates an AND signal S6 of OR signal S5 and a logic decision signal S0c. The AND signal S6 has a low level when either the OR signal S5 or the logic decision signal S0c is at a low level, and has a high level when both the OR signal S5 and the logic decision signal S0c are at a high level. That is, when the logic decision signal S0c is at the high level, the OR signal S5 is output through as the AND signal S6, while when the logic decision signal S0c is at the low level, the AND signal S6 is fixed at the low level without depending on the OR signal S5. The logic decision signal S0c is a signal used in shipment test and is not used after shipment, so it is fixed at a high level. If the shipment test is not performed, the AND gate 166 becomes unnecessary, and the OR signal S5, instead of the AND signal S6, may be output, as it is, to the subsequent stage.

The analog switch 167a is connected between an input end of the hold voltage Va and the output end of the feedback voltage V1. For example, the analog switch 167a is turned on when the AND signal S6 is at a high level, and is turned off when the AND signal S6 is at a low level.

The analog switch 167b is connected between an input end of the hold voltage Vb and the output end of the feedback voltage V1. For example, the analog switch 167b is turned on when an inverted AND signal S6B is at a high level, and is turned off when the inverted AND signal S6B is at a low level.

The inverter 168 inverts the logic level of the AND signal S6 to generate the inverted AND signal S6B. The inverted AND signal S6B has a low level when the AND signal S6 is at a high level, and has a high level when the AND signal S6 is at a low level.

The capacitor 169 is connected between the output end of the feedback voltage V1 and the ground end. During the turning-on period of the analog switch 167a, the capacitor 169 is charged with the hold voltage Va. On the other hand, during the turning-on period of the analog switch 167b, the capacitor 169 is charged with the hold voltage Vb. That is, when the AND signal S6 is at a high level, the hold voltage Va is selectively output as the feedback voltage V1, while when the AND signal S6 is at a low level, the hold voltage Vb is selectively output as the feedback voltage V1.

Among the above components, the blocks at the subsequent stages of the comparator 163 (the Schmitt trigger 164, the OR gate 165, the AND gate 166, the analog switches 167a and 167b, the inverter 168, and the capacitor 169)

correspond to a feedback voltage output part that outputs a higher one of the hold voltages Va and Vb according to the selection signal S3, as the feedback voltage V1.

In particular, when the sample/hold part 16 of the present embodiment includes the OR gate 165 in the feedback voltage output part and the on-duty Don of the output switch 11 (accordingly the primary current Ip) is higher than a predetermined threshold value, the voltage Va sampled/held at the latest timing without depending on the selection signal S3 is output as the feedback voltage V1.

In this way, if a configuration is such that the monitor voltage V0 is sampled/held at a plurality of different timings and one of the hold voltages Va and Vb is output as the feedback voltage V1 according to the result of comparison between the hold voltages Va and Vb and the on-duty Don (accordingly the load state), it is possible to obtain the optimal output voltage information from the monitor voltage V0 and improve the load regulation.

In a case where the monitor voltage V0 is sampled/held at three or more sampling timings (for example, a latest timing control signal S0s, an intermediate timing control signal S0m, and an earliest timing control signal S0f), the highest one of a plurality of hold voltages Vs, Vm, and Vf may be output as the feedback voltage V1. Further, when the on-duty Don of the output switch 11 (accordingly the primary current Ip) is higher than the predetermined threshold value, the voltage Vs sampled/held at the latest timing without depending on the result of comparison between the plurality of hold voltages Vs, Vm, and Vf may be output as the feedback voltage V1.

Figure 9:
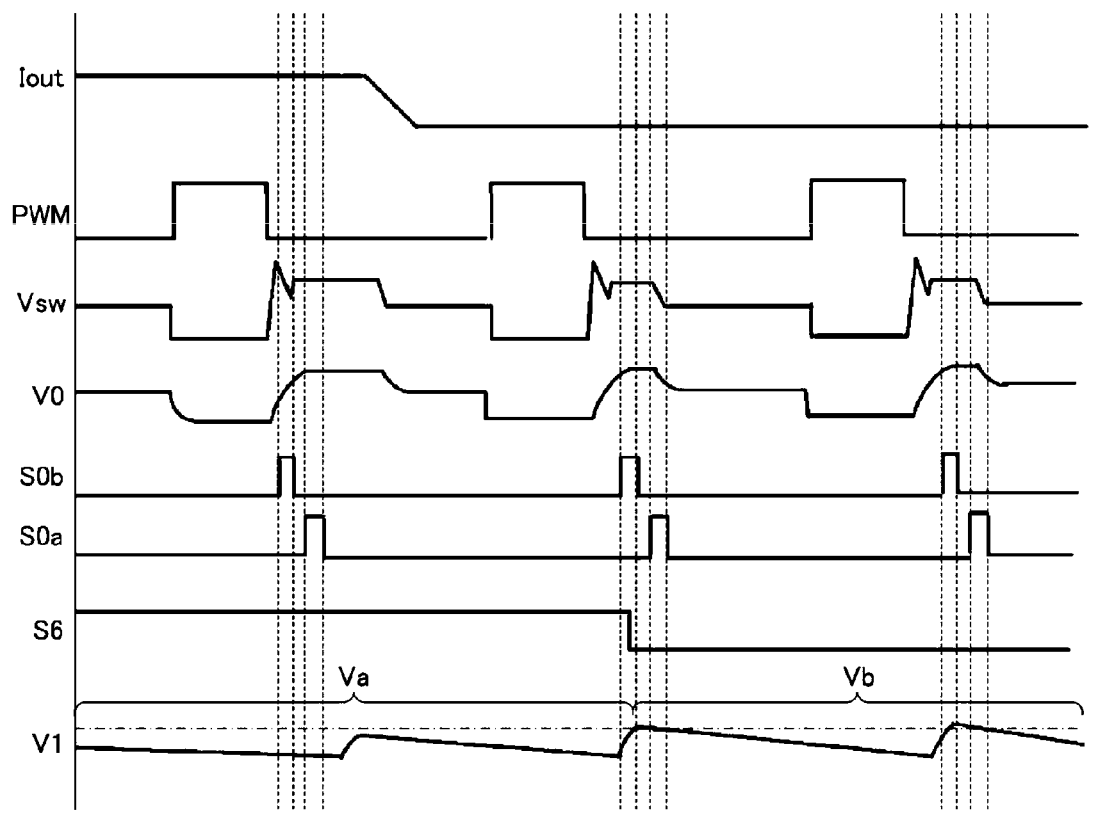
FIG. 9 is a diagram showing a first example of a sample/hold operation in the second embodiment.

FIG. 9 is a diagram showing a first example (when a load fluctuates) of a sample/hold operation in the second embodiment, depicting an output current tout flowing through the load, the pulse signal PWM, the switch voltage Vsw, the monitor voltage V0, the timing control signals S0b and S0a, the AND signal S6, and the feedback voltage V1 in order from the top. It is assumed that the logic decision signal S0c (not shown) is at a high level. Further, in this figure, it is assumed that the duty information signal SD is at a low level and the selection signal S4 (accordingly the selection signal S3) is valid.

As shown in this figure, the timing control signals S0a and S0b are pulse-driven at different timings. Referring to this figure, the timing control signal S0b has a high level at the second sampling timing (for example, between 150 and 250 ns with a timing at which the pulse signal PWM falls to a low level, as a reference (0 s)). On the other hand, the timing control signal S0a has a high level at the first sampling timing (for example, between 350 and 430 ns with a timing at which the pulse signal PWM falls to a low level, as a reference (0 s)), which is later than the second sampling timing.

The high level period of each of the timing control signals S0a and S0b corresponds to the turning-on period (=the sampling period) of each of the analog switches 161a and 161b. Further, the low level period of each of the timing control signals S0a and S0b corresponds to the turning-off period (=the hold period) of each of the analog switches 161a and 161b.

Further, when the duty information signal SD is at a low level and the logic decision signal S0c is at a high level, the AND signal S6 also has a high level when the selection signal S3 is at a high level (Va>Vb), and also has a low level when the selection signal S3 is at a low level (Va<Vb). When the AND signal S6 is at the high level, the hold voltage Va is selectively output as the feedback voltage V1. On the other hand, when the selection signal S3 is at the low level, the hold voltage Vb is selectively output as the feedback voltage V1.

In this way, if a configuration is such that the monitor voltage V0 is sampled/held at a plurality of different timings and one of the hold voltages Va and Vb is output as the feedback voltage V1 according to the result of comparison between the hold voltages Va and Vb and the on-duty Don (accordingly the load state), it is possible to obtain the optimal output voltage information from the monitor voltage V0 and improve the load regulation since the output feedback control can be applied so that the feedback voltage V1 matches the target value (see a one-dot chain line).

Figure 10:
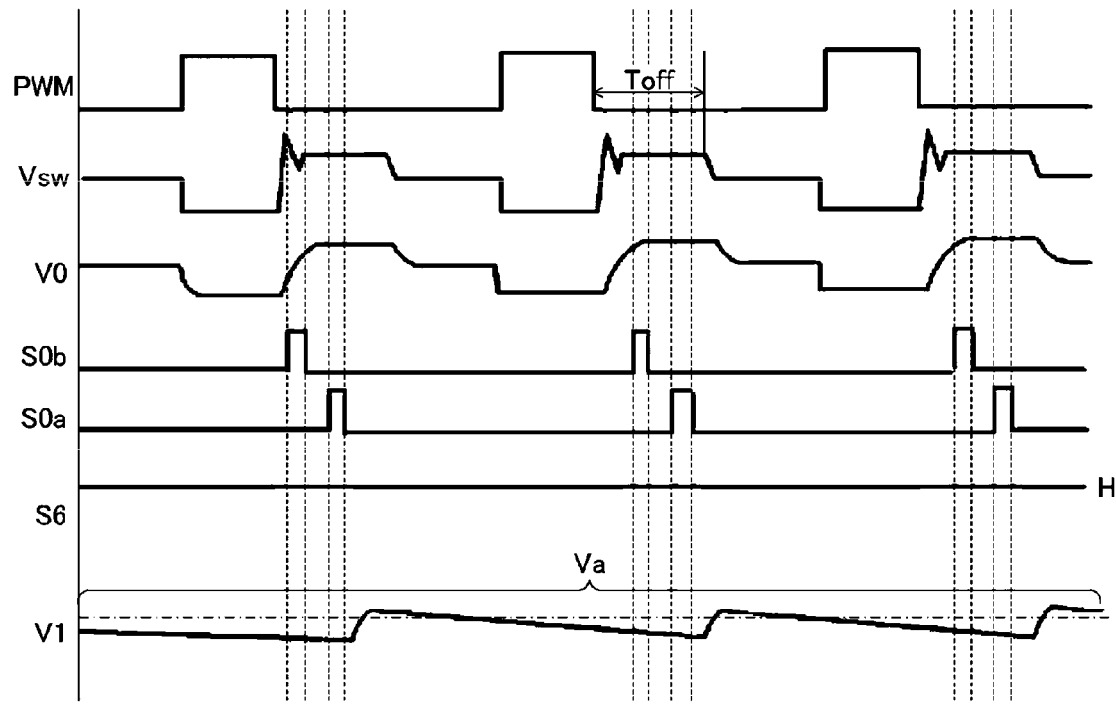
FIG. 10 is a diagram showing a second example of a sample/hold operation in the second embodiment.

FIG. 10 is a diagram showing a second example (at the time of heavy load) of the sample/hold operation in the second embodiment, depicting the output current Iout flowing through the load, the pulse signal PWM, the switch voltage Vsw, the monitor voltage V0, the timing control signals S0b and S0a, the AND signal S6, and the feedback voltage V1 in order from the top, as in FIG. 9. It is assumed that the logic decision signal S0c (not shown) is at a high level.

In this figure, the AND signal S6 is fixed at a high level in response to the fact that the duty information signal SD is at a high level. That is, the hold voltage Va is forcibly selectively output as the feedback voltage V1 regardless of the result (=the selection signal S3) of comparison between the hold voltages Va and Vb.

When the load is heavy and the on-duty Don is higher than a predetermined threshold value (for example, 38%), since the off-time Toff is inevitably long, it is not necessary to advance the sampling timing. Therefore, for example, by fixedly outputting the hold voltage Va obtained at the latest sampling timing, as the feedback voltage V1, it is less likely to be affected by a surge component of the switch voltage Vsw generated when the output switch 11 is turned off. In addition, the possibility of sampling the monitor voltage V0 in the middle of the rising is reduced.

<Second Example of the Present Disclosure>
<Consideration on Frequency Jitter Function>

In recent years, with the increase in functionality, speed, or integration of electronic apparatuses, electromagnetic radiation (so-called EMI [electro-magnetic interference]) radiated from LSIs installed in the electronic apparatuses has become problematic. There are strict international standards for EMI not only for LSIs that are installed in consumer equipment, but also for LSIs for in-vehicle equipment and industrial equipment, and LSIs that cannot meet the standards cannot be installed in vehicle equipment and industrial equipment.

A frequency jitter function is known as one of the EMI countermeasures. For example, if the frequency jitter function is introduced into a switching power supply and a switching frequency is periodically switched, it is possible to suppress the peak of EMI as compared with a case where the switching frequency has a fixed value.

However, since a general insulated switching power supply that operates in BCM [boundary current mode] operates at a timing when a winding voltage of a transformer becomes zero voltage in principle, the frequency jitter function cannot be introduced.

On the other hand, in the insulated switching power supply 1, in addition to the hysteresis control type controller 12 that causes the output switch 11 to operate in CCM [continuous current mode] (or DCM [discontinuous current mode]) with a constant duty D (=Ton/(Ton+Toff)), the above-mentioned frequency jitter function is introduced by mounting a frequency jitter part 1A configured to apply a jitter to the on-time Ton of the output switch 11.

The insulated switching power supply 1 adopts the separately excited control (for example, bottom detection type time fixed method, which is a kind of hysteresis control method) that can set the on-time Ton (or off-time Toff) of the output switch 11 inside the semiconductor device 10. That is, the on-time Ton of the output switch 11 is set by the controller 12 built in the semiconductor device 10.

The controller 12 also has a function of controlling the off timing (that is, the length of the on-time Ton) of the output switch 11 so that the duty D of the output switch 11 becomes constant. Therefore, by adjusting the on-time Ton, the off-time Toff is also determined under the relational expression Toff=Ton×(1−D)/D.

Therefore, when the frequency jitter part 1A is used to apply a jitter to the on-time Ton, the off-time Toff also has a jitter, and accordingly, the switching frequency fsw (=1/(Ton+Toff)) can have a jitter.

Figure 11:
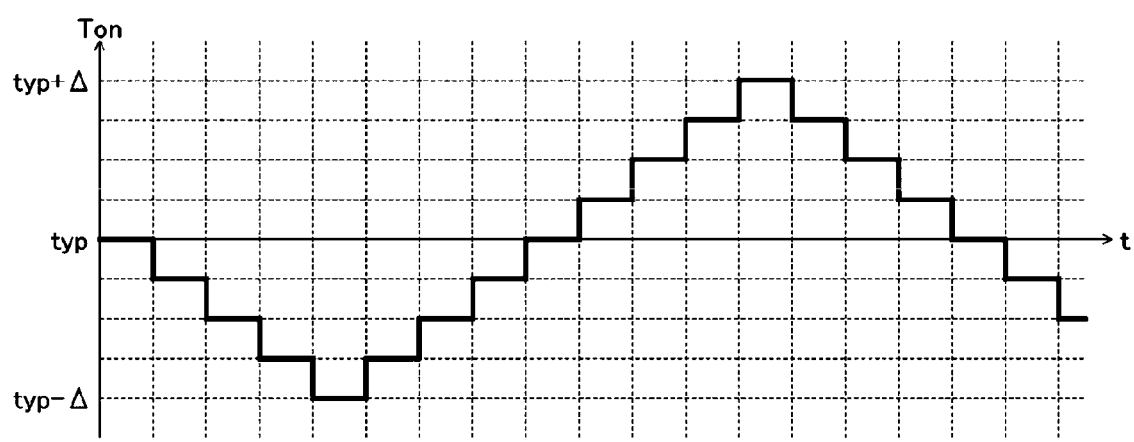
FIG. 11 is a diagram showing a state where an on-time has a jitter.
Figure 12:
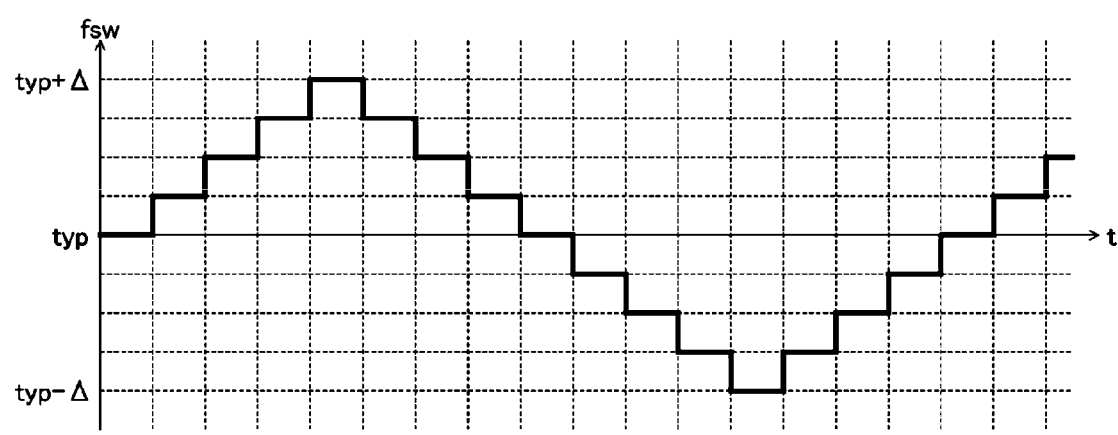
FIG. 12 is a diagram showing a state where a switching frequency has a jitter.

FIGS. 11 and 12 are diagrams showing states where the on-time Ton and the switching frequency fsw (=1/(Ton+Toff)) have jitters, respectively. As can be seen from both figures, the switching frequency fsw can be periodically changed in a range of typ±Δ (for example, 400±40 kHz) by periodically changing the on-time Ton in a range of typ±Δ (for example, 1±0.1 μs).

<Frequency Jitter Part>

Figure 13:
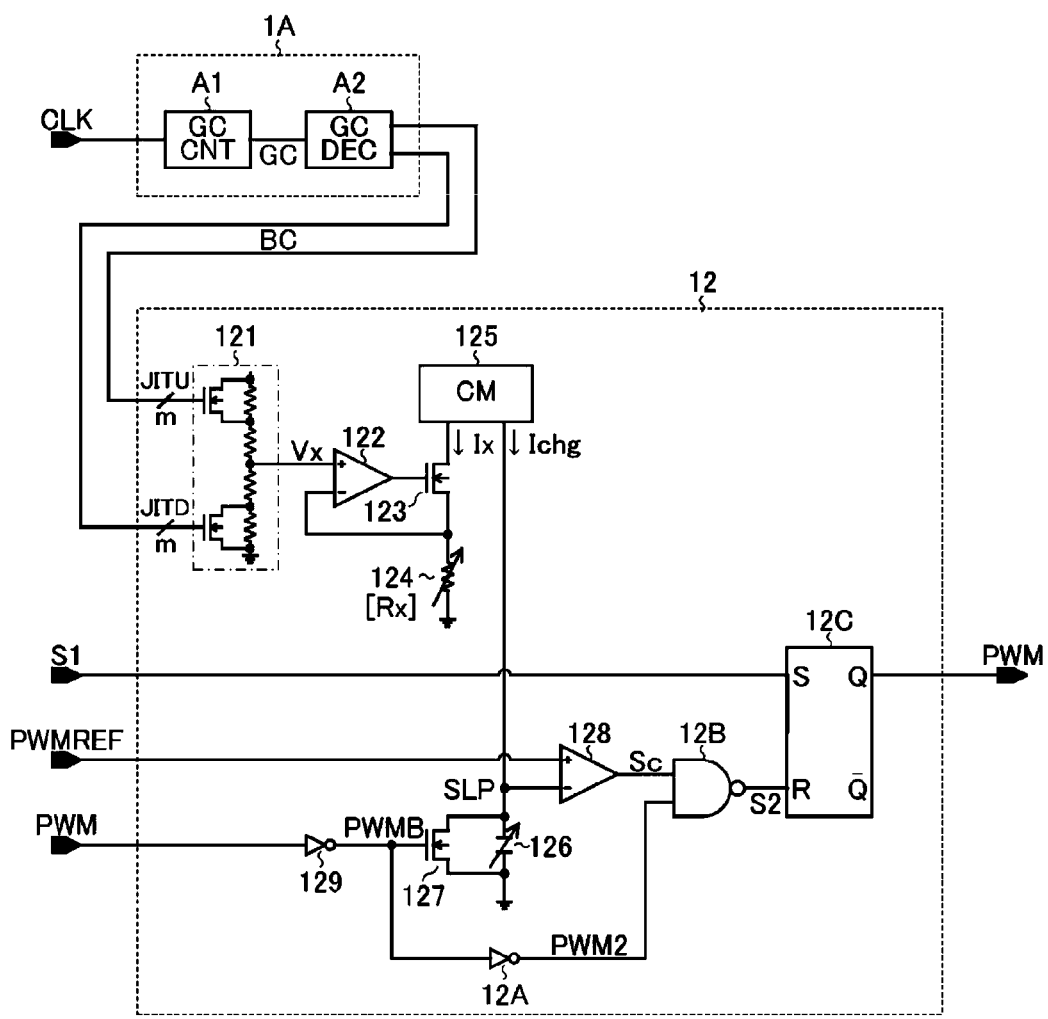
FIG. 13 is a diagram showing a configuration example of a frequency jitter part and a controller.

FIG. 13 is a diagram showing a configuration example of the frequency jitter part 1A and the controller 12. The frequency jitter part 1A includes a gray code counter A1 and a gray code decoder A2.

The gray code counter A1 outputs a gray code GC in synchronization with a clock signal CLK of a predetermined frequency (for example, several tens of μs). In the gray code GC, only one bit of data always changes at the time of incrementing or decrementing. In this way, by using the gray code GC that does not cause simultaneous changes of multiple bits, it is possible to avoid an occurrence of glitch noise and realize a highly reliable frequency jitter function.

The gray code decoder A2 converts the gray code GC into a 2m-bit binary code BC and outputs the 2m-bit binary code BC.

On the other hand, the controller 12 includes a jitter voltage generation part 121, an operational amplifier 122, an N-channel MOS field effect transistor 123, a resistor 124 (resistance value Rx), a current mirror 125, a capacitor 126 (capacitance value Cx), an N-channel type MOS field effect transistor 127, a comparator 128, inverters 129 and 12A, a NAND gate 12B, and an RS flip flop 12C.

The jitter voltage generation part 121 generates a jitter voltage Vx having a DC value corresponding to the binary code BC output from the gray code decoder A2. The jitter voltage generation part 121 includes, for example, a resistor ladder formed by connecting a plurality of resistors in series, and a plurality of switch elements connected in parallel to the plurality of resistors, respectively, and may be configured to turn on/off the plurality of switch elements according to each bit value of the binary code BC. At that time, for example, the upper m bits of the binary code BC (for example, m=4) may be used as an up-trim code JITU of the jitter voltage Vx, and the lower m bits of the binary code BC may be used as a down-trim code JITD of the jitter voltage Vx (or vice versa).

The operational amplifier 122 controls the gate of the transistor 123 so that the jitter voltage Vx input to a non-inverting input end (+) and a node voltage (=Ix×Rx) of the resistor 124 input to an inverting input end (−) are imaginarily short-circuited.

The drain of the transistor 123 is connected to a current input end of the current mirror 125. The source of the transistor 123 is connected to the inverting input end (−) of the operational amplifier 122 and a first end of the resistor 124. A second end of the resistor 124 is connected to a grounded end. The gate of the transistor 123 is connected to an output end of the operational amplifier 122.

The resistor 124 functions as a voltage/current conversion element that converts the jitter voltage Vx into a drain current Ix (=Vx/Rx) of the transistor 123. The resistor 124 may be configured so that the resistance value Rx can be arbitrarily trimmed by using a method such as laser repair.

The current mirror 125 outputs a charging current Ichg (=α×Ix) from a current output end by mirroring the drain current Ix of the transistor 123 flowing through the current input end with a predetermined mirror ratio α (for example, α=1).

A first end (=an output end of a slope voltage SLP) of the capacitor 126 is connected to the current output end of the current mirror 125. A second end of the capacitor 126 is connected to the grounded end. The capacitor 126 may be configured so that the capacitance value Cx can be arbitrarily trimmed by using a method such as laser repair.

The drain of the transistor 127 is connected to the first end of the capacitor 126. A second end of the transistor 127 is connected to the second end of the capacitor 126. The gate of the transistor 127 is connected to an output end (=an application end of an inverted pulse signal PWMB) of the inverter 129. The transistor 127 connected in this way functions as a discharging switch that discharges the electric charges (accordingly the slope voltage SLP) stored in the capacitor 126 according to the inverted pulse signal PWMB.

The transistor 127 is turned on when the inverted pulse signal PWMB is at a high level, and is turned off when the inverted pulse signal PWMB is at a low level. As a result, the slope voltage SLP rises with a slope corresponding to the charging current Ichg when the pulse signal PWM is at a high level, and it is discharged to a zero value when the pulse signal PWM is at a low level. That is, the slope voltage SLP becomes a slope waveform (saw waveform) synchronized with the turning-on/off of the output switch 11.

The comparator 128 compares a DC voltage PWMREF (=a product of the duty D of the output switch 11 and a coefficient K) input to a non-inverting input end (+) with the slope voltage SLP input to an inverting input end (−) to generate a comparison signal Sc. Therefore, the comparison signal Sc has a high level when the DC voltage PWMREF is higher than the slope voltage SLP, and has a low level when the DC voltage PWMREF is lower than the slope voltage SLP.

The lower the DC voltage PWMREF or the larger the slope of the slope voltage SLP, the earlier the intersection timing of the DC voltage PWMREF and the slope voltage SLP. Therefore, the pulse generation timing of the comparison signal Sc (accordingly the turning-off timing of the output switch 11) becomes earlier.

Conversely, the higher the DC voltage PWMREF or the smaller the slope of the slope voltage SLP, the later the intersection timing of the DC voltage PWMREF and the slope voltage SLP. Therefore, the pulse generation timing of the comparison signal Sc (accordingly the turning-off timing of the output switch 11) becomes later.

By the way, the slope of the slope voltage SLP becomes steeper as the charging current Ichg of the capacitor 126 becomes larger, and becomes smoother as the charging current Ichg of the capacitor 126 becomes smaller. Further, the charging current Ichg increases as the jitter voltage Vx increases, and decreases as the jitter voltage Vx decreases.

Therefore, by switching the jitter voltage Vx according to the binary code BC output from the frequency jitter part 1A, the charging current Ichg of the capacitor 126 is switched, and further, the slope of the slope voltage SLP is switched. As a result, a jitter can be applied to the pulse generation timing (=the turning-off timing of the output switch 11) of the comparison signal Sc, and accordingly a jitter can be applied to the on-time Ton of the output switch 11.

The inverter 129 generates the inverted pulse signal PWMB by inverting the logic level of the pulse signal PWM. Therefore, the inverted pulse signal PWMB has a low level when the pulse signal PWM is at a high level, and has a high level when the pulse signal PWM is at a low level.

The inverter 12A generates a pulse signal PWM2 by inverting the logic level of the inverted pulse signal PWMB. Therefore, the pulse signal PWM2 has a low level when the inverted pulse signal PWMB is at a high level, and has a high level when the inverted pulse signal PWMB is at a low level. That is, the pulse signals PWM and PWM2 have the same logic level if a signal delay is ignored.

The NAND gate 12B generates a reset signal S2 by performing a negative AND operation of comparison signal Sc and pulse signal PWM2. Therefore, when the pulse signal PWM2 (accordingly the pulse signal PWM) is at the high level, the logic inversion of the comparison signal Sc is output as the reset signal S2. On the other hand, when the pulse signal PWM2 (accordingly the pulse signal PWM) is at the low level, the reset signal S2 is fixed at a high level without depending on the comparison signal Sc.

The RS flip flop 12C decides the logic level of the pulse signal PWM output from an output end Q, based on both the set signal S1 input to a set end (S) and the reset signal S2 input to a reset end (R). For example, the pulse signal PWM is set to a high level at the pulse generation timing of the set signal S1 and is reset to a low level at the pulse generation timing of the reset signal S2.

The inverter 12A and the NAND gate 12B may be omitted.

Figure 14:
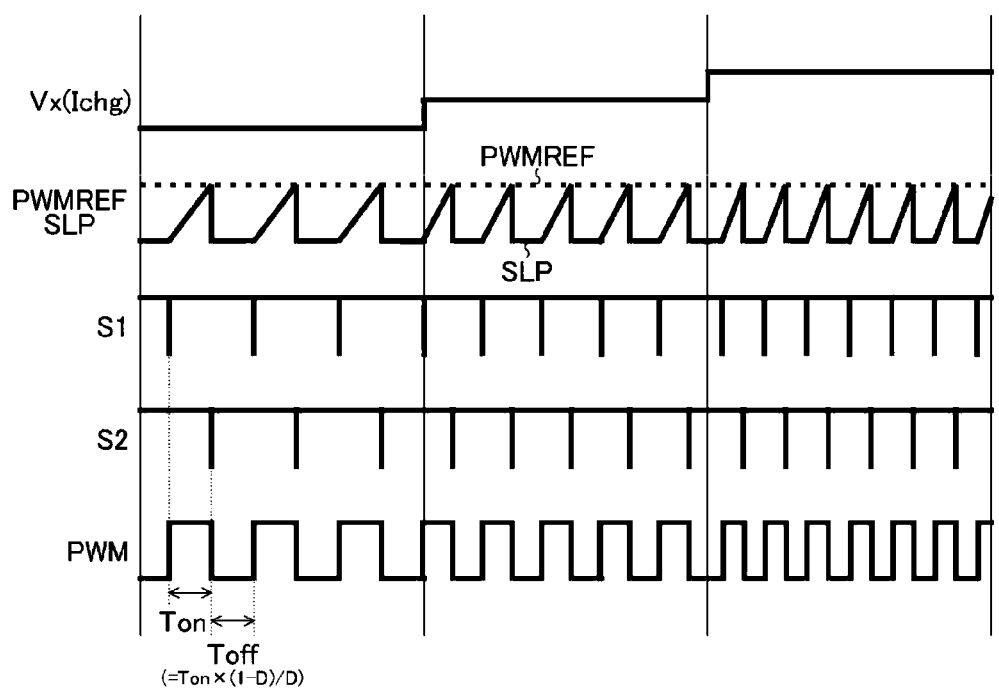
FIG. 14 is a diagram showing an example of reset signal generation operation.

FIG. 14 is a diagram showing an example of a reset signal generation operation in the controller 12, depicting the jitter voltage Vx (the charging current Ichg), the DC voltage PWMREF (broken line), the slope voltage SLP (solid line), the set signal S1, the reset signal S2, and the pulse signal PWM in order from the top.

As can be seen from this figure, the lower the jitter voltage Vx, the smaller the slope of the slope voltage SLP. Therefore, even if a load is constant (the DC voltage PWMREF does not change), an intersection timing between the DC voltage PWMREF and the slope voltage SLP is late. Therefore, a pulse is generated in the reset signal S2 at a later timing, and the pulse signal PWM is reset to the low level. As a result, the on-time Ton (and the off-time Toff) of the output switch 11 becomes long, and accordingly the switching frequency fsw becomes low.

Conversely, the higher the jitter voltage Vx, the larger the slope of the slope voltage SLP. Therefore, even if the load is constant (the DC voltage PWMREF does not change), the intersection timing between the DC voltage PWMREF and the slope voltage SLP becomes earlier. Therefore, a pulse is generated in the reset signal S2 at an earlier timing, and the pulse signal PWM is reset to the low level. As a result, the on-time Ton (and the off-time Toff) of the output switch 11 becomes short, and accordingly the switching frequency fsw becomes high.

Figure 15:
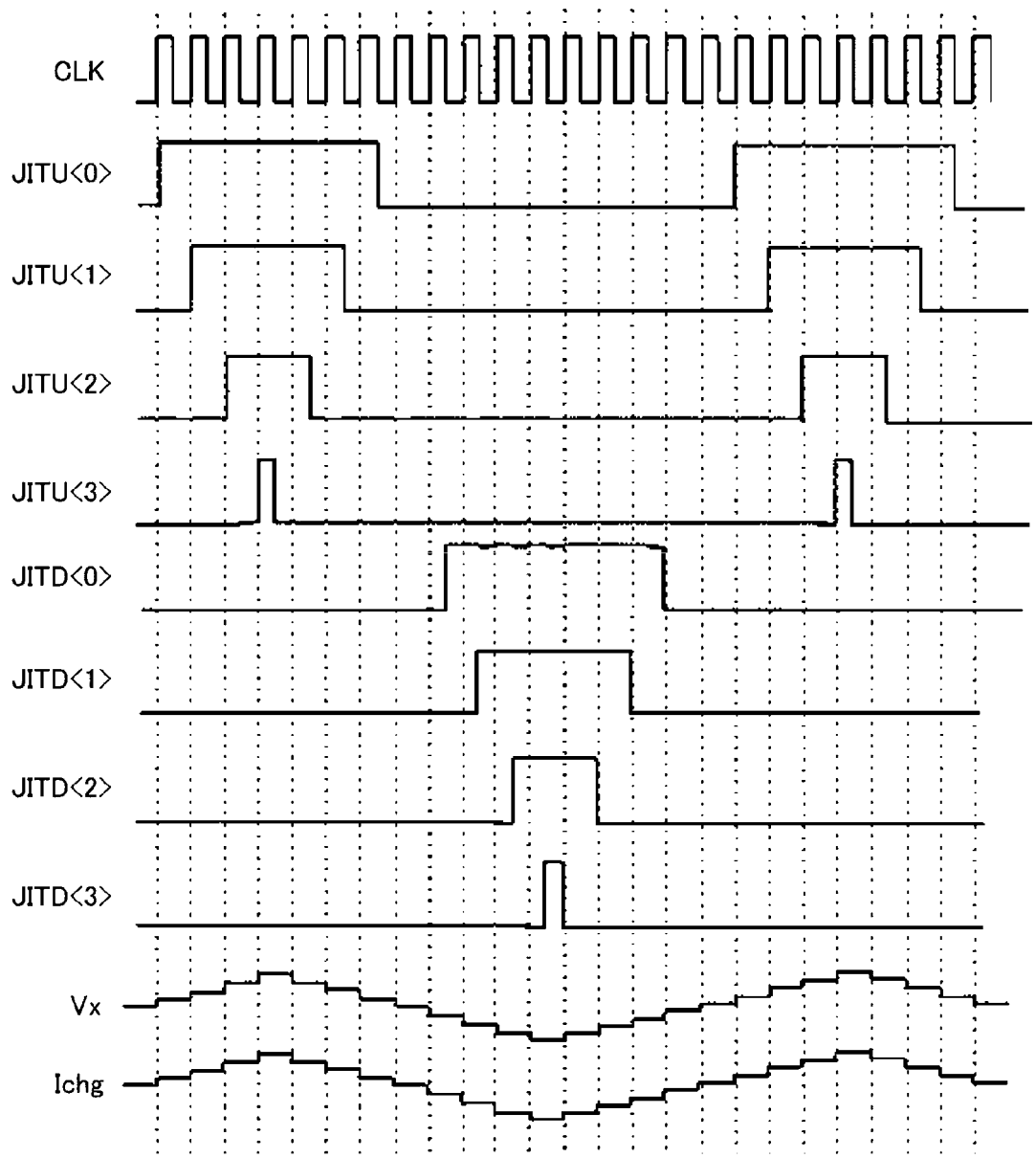
FIG. 15 is a diagram showing an example of a jitter applying operation.

FIG. 15 is a diagram showing an example of jitter applying operation, depicting the clock signal CLK, up-trim codes JITU<0> to <3>, down-trim codes JITD<0> to <3>, the jitter voltage Vx, and the charging current Ichg in order from the top.

As shown in this figure, each time the up-trim codes JITU<0> to <3> and the down-trim codes JITD<0> to <3> are sequentially changed bit by bit in synchronization with the clock signal CLK, the jitter voltage Vx gradually increases or decreases, and accordingly, the charging current Ichg (accordingly the switching frequency fsw) gradually increases or decreases.

<Application to Vehicle>

Figure 16:
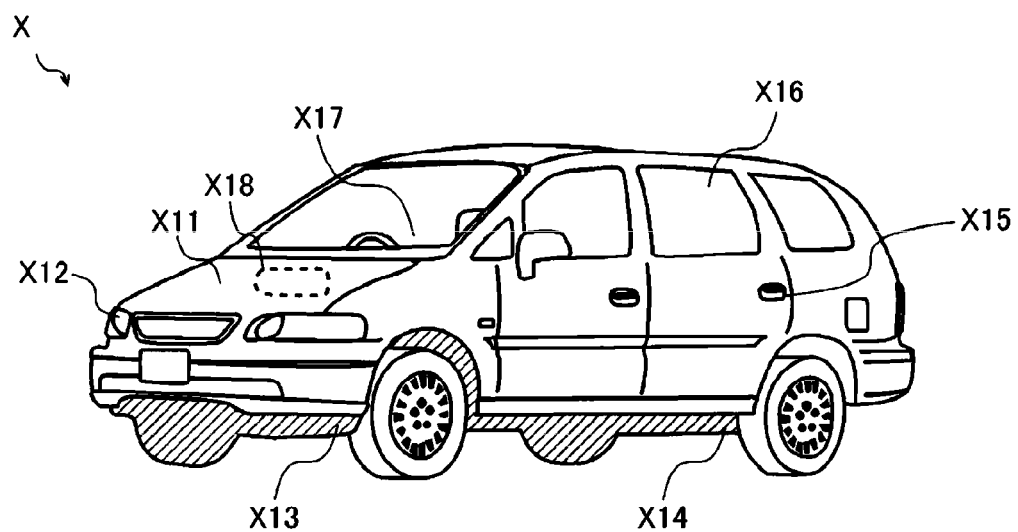
FIG. 16 is a view showing an exterior appearance of a vehicle.

FIG. 16 is a view showing an exterior appearance of a vehicle in which the electronic apparatus according to the First Example or the Second Example of the present disclosure is equipped. The vehicle X of this configuration example is equipped with various electronic apparatuses X11 to X18 that are operated by receiving electric power from a battery (not shown). The installation positions of the electronic apparatuses X11 to X18 in this figure may differ from actual installation positions for convenience of illustration.

The electronic apparatus X11 is an engine control unit that performs engine-related control (injection control, electronic throttle control, idling control, oxygen sensor heater control, auto cruise control, etc.).

The electronic apparatus X12 is a lamp control unit that performs turning-on/off control of HID [High Intensity Discharged Lamp] or DRL [Daytime Running Lamp].

The electronic apparatus X13 is a transmission control unit that performs transmission-related control.

The electronic apparatus X14 is a brake unit that performs movement-related control of the vehicle X (ABS [Anti-lock Brake System] control, EPS [Electric Power Steering] control, electronic suspension control, etc.).

The electronic apparatus X15 is a security control unit that drives and controls a door lock or a security alarm.

The electronic apparatus X16 is an electronic apparatus incorporated in the vehicle X at the factory shipment stage, as standard equipment or a manufacturer's options such as a wiper, an electric door mirror, a power window, a damper (shock absorber), an electric sunroof, and an electric seat.

The electronic apparatus X17 is an electronic apparatus that is optionally attached to the vehicle X, as user's options such as an in-vehicle A/V [Audio/Visual] device, a car navigation system, and an ETC [Electronic Toll Collection System].

The electronic apparatus X18 is an electronic apparatus equipped with high withstand voltage motors such as an in-vehicle blower, an oil pump, a water pump, and a battery cooling fan.

The above-described insulated switching power supply 1 can be incorporated into any of the electronic apparatuses X11 to X18.

<Other Modifications>

In addition to the above-described embodiments, various technical features disclosed in the present disclosure can be modified in various ways without departing from the spirit of the technical creation. That is, it should be considered that the above-described embodiments are illustrative in all respects, not restrictive. The technical scope of the present disclosure is not limited to the above-described embodiments, but it should be understood to encompass all changes that fall within the claims and the meaning and scope of the equivalents thereof.

According to the First Example of the present disclosure in some embodiments, it is possible to provide a power supply controller having excellent load regulation, and an insulated switching power supply using the same.

Further, according to the Second Example of the present disclosure in some embodiments, it is possible to provide a power supply controller having excellent EMI characteristics, and an insulated switching power supply using the same.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply controller comprising:
   a monitor voltage generation part configured to generate a monitor voltage according to a primary voltage of a transformer that forms an insulated switching power supply;
   a sample/hold part configured to sample/hold the monitor voltage and output a feedback voltage;
   a controller configured to turn on/off a primary current of the transformer by a fixed on-time method according to the feedback voltage; and
   a comparator configured to compare the feedback voltage with a slope-shaped reference voltage to generate a set signal,
   wherein the sample/hold part samples/holds the primary voltage at a plurality of different timings and outputs one of a plurality of hold values as the feedback voltage, and
   wherein the controller determines on-timing of the primary current according to the set signal.

2. The power supply controller of claim 1, wherein the sample/hold part outputs the highest one of the plurality of hold values as the feedback voltage.

3. The power supply controller of claim 2, wherein when on-duty of the primary current is higher than a predetermined threshold value, the sample/hold part outputs a hold value sampled/held at the latest timing as the feedback voltage, without depending on a result of comparison of the plurality of hold values.

4. The power supply controller of claim 1, wherein the sample/hold part includes: a plurality of sets of analog switches and capacitors configured to output the plurality of hold values by sampling/holding the monitor voltage at a plurality of different timings;
   at least one comparator configured to compare the plurality of hold values to generate a selection signal; and
   a feedback voltage output part configured to output the highest one of the plurality of hold values as the feedback voltage, according to the selection signal.

5. The power supply controller of claim 4, wherein when on-duty of the primary current is higher than a predetermined threshold value, the feedback voltage output part outputs a hold value sampled/held at the latest timing as the feedback voltage, without depending on the selection signal.

6. The power supply controller of claim 1, wherein the monitor voltage is a voltage signal obtained by blunting the primary voltage.

7. The power supply controller of claim 1, wherein the primary voltage is a switch voltage appearing in a primary winding of the transformer.

8. An insulated switching power supply comprising:
   the power supply controller of claim 1;
   a transformer configured to apply a DC input voltage to a primary winding; and
   a rectifying/smoothing circuit configured to generate a DC output voltage by rectifying/smoothing an induced voltage appearing in a secondary winding of the transformer.

9. A vehicle comprising: the insulated switching power supply of claim 8.

10. A power supply controller comprising:
    a monitor voltage generation part configured to generate a monitor voltage according to a primary voltage of a transformer that forms an insulated switching power supply;
    a sample/hold part configured to sample/hold the monitor voltage and output a feedback voltage; and
    a controller configured to turn on/off a primary current of the transformer by a fixed on-time method according to the feedback voltage,
    wherein the sample/hold part samples/holds the primary voltage at a plurality of different timings and outputs one of a plurality of hold values as the feedback voltage,
    wherein the sample/hold part includes:
       a plurality of sets of analog switches and capacitors configured to output the plurality of hold values by sampling/holding the monitor voltage at a plurality of different timings;
       at least one comparator configured to compare the plurality of hold values to generate a selection signal; and
       a feedback voltage output part configured to output the highest one of the plurality of hold values as the feedback voltage, according to the selection signal, and
    wherein when on-duty of the primary current is higher than a predetermined threshold value, the feedback voltage output part outputs a hold value sampled/held at the latest timing as the feedback voltage, without depending on the selection signal.

* * * * *